(12) United States Patent
Lee (10) Patent No.: US 6,616,163 B2
(45) Date of Patent: Sep. 9, 2003

(54) COMBINED SKATEBOARD SCOOTER/EXERCISER

(76) Inventor: Jung-Tien Lee, No. 12, Yung Ta $1^{st}$ Road, Yung Kang City, Tainan Hsien (TW)

( * ) Notice: Subject to any disclaimer, the term of this patent is extended or adjusted under 35 U.S.C. 154(b) by 0 days.

(21) Appl. No.: 09/987,512

(22) Filed: Nov. 15, 2001

(65) Prior Publication Data

US 2002/0096855 A1 Jul. 25, 2002

Related U.S. Application Data

(63) Continuation-in-part of application No. 09/765,415, filed on Jan. 22, 2001, now Pat. No. 6,375,208.

(51) Int. Cl.$^7$ ................................................ B62M 1/16
(52) U.S. Cl. ........................ 280/245; 280/282; 280/240; 280/220
(58) Field of Search ................... 280/242.1, 243, 280/244, 245, 246, 247, 252, 253, 254, 255, 256, 257, 258, 282, 240, 220

(56) References Cited

U.S. PATENT DOCUMENTS

| | | | | |
|---|---|---|---|---|
| 1,309,855 A | * | 7/1919 | Johnson | 280/240 |
| 1,598,855 A | * | 9/1926 | Dunlop | 280/240 |
| 1,801,526 A | * | 4/1931 | Neuman, Jr. | 280/240 |
| 3,829,126 A | * | 8/1974 | Lohr et al. | 280/240 |
| 4,189,166 A | * | 2/1980 | Lindsey | 280/234 |
| 5,169,165 A | * | 12/1992 | Oates | 280/87.03 |
| 6,179,307 B1 | * | 1/2001 | Mao | 280/87.041 |

* cited by examiner

Primary Examiner—Kevin Hurley
(74) Attorney, Agent, or Firm—Rosenberg, Klein & Lee (57) ABSTRACT

A combined skateboard scooter/exerciser comprises a handlebar, a board, a steering device, a transmission device, and a wheel device. The steering rod is rotatably supported by the board and thus rotatable relative to the board. In addition, the steering rod is movable back and forth relative to the board. The handlebar is mounted to an upper end of the steering rod to move therewith. The steering device is mounted to a lower end of the steering rod to move therewith. The wheel device is mounted to the steering device. The transmission device is mounted between the lower end of the steering rod and the wheel device such that back and forth movement of the steering rod urges the wheel device to move forward via transmission by the transmission device.

8 Claims, 9 Drawing Sheets

COMBINED SKATEBOARD SCOOTER/EXERCISER

CROSS REFERENCE TO RELATED APPLICATION

This is a continuation-in-part application of U.S. patent application Ser. No. 09/765,415 filed on Jan. 22, 2001 U.S. Pat. No. 6,375,208.

BACKGROUND OF THE INVENTION

1. Field of the Invention

The present invention relates to a combined skateboard scooter/exerciser, and more particularly to a skateboard scooter that can also be used as an exerciser for the user to perform rowing-like exercise while moving the skateboard scooter forward.

2. Description of the Related Art

In order to provide an exercise effect, a wide variety of exercisers have been developed. Some of them are fixed in place, such as treaders, universal gyms, etc., and the others are mobile, such as bicycles, skates, skateboards, skateboard scooters, etc. In a typical bicycle or skateboard scooter, front and rear wheels are attached to a frame or board thereof and a handle is provided to control the moving direction, and it is moved by the user's legs. The upper body of the user is not exercised, and such an exerciser is not suitable for people that are handicapped in legs. Applicant's U.S. Ser. No. 09/765,415 filed on Jan. 22, 2001 discloses a skateboard scooter that can also be used as an exerciser for the user to perform rowing-like exercise. The present application is intended to provide a different design in this regard.

SUMMARY OF THE INVENTION

It is an object of the present invention to provide a skateboard scooter that can also be used as an exerciser for the user to perform rowing-like exercise.

A combined skateboard scooter/exerciser in accordance with the present invention comprises a handlebar, a board, a steering device, a transmission device, and a wheel device. The steering rod is rotatably supported by the board and thus rotatable relative to the board. In addition, the steering rod is movable back and forth relative to the board. The handlebar is mounted to an upper end of the steering rod to move therewith. The steering device is mounted to a lower end of the steering rod to move therewith. The wheel device is mounted to the steering device. The transmission device is mounted between the lower end of the steering rod and the wheel device such that back and forth movement of the steering rod urges the wheel device to move forward via transmission by the transmission device.

Other objects, advantages, and novel features of the invention will become more apparent from the following detailed description when taken in conjunction with the accompanying drawings.

DETAILED DESCRIPTION OF THE PREFERRED EMBODIMENTS

Referring to FIGS. 1 through 4, a combined skateboard scooter/exerciser in accordance with the present invention generally includes a handlebar 1, a board 2, a steering device 3, a transmission device 4, and a wheel device 5.

Figure 1:
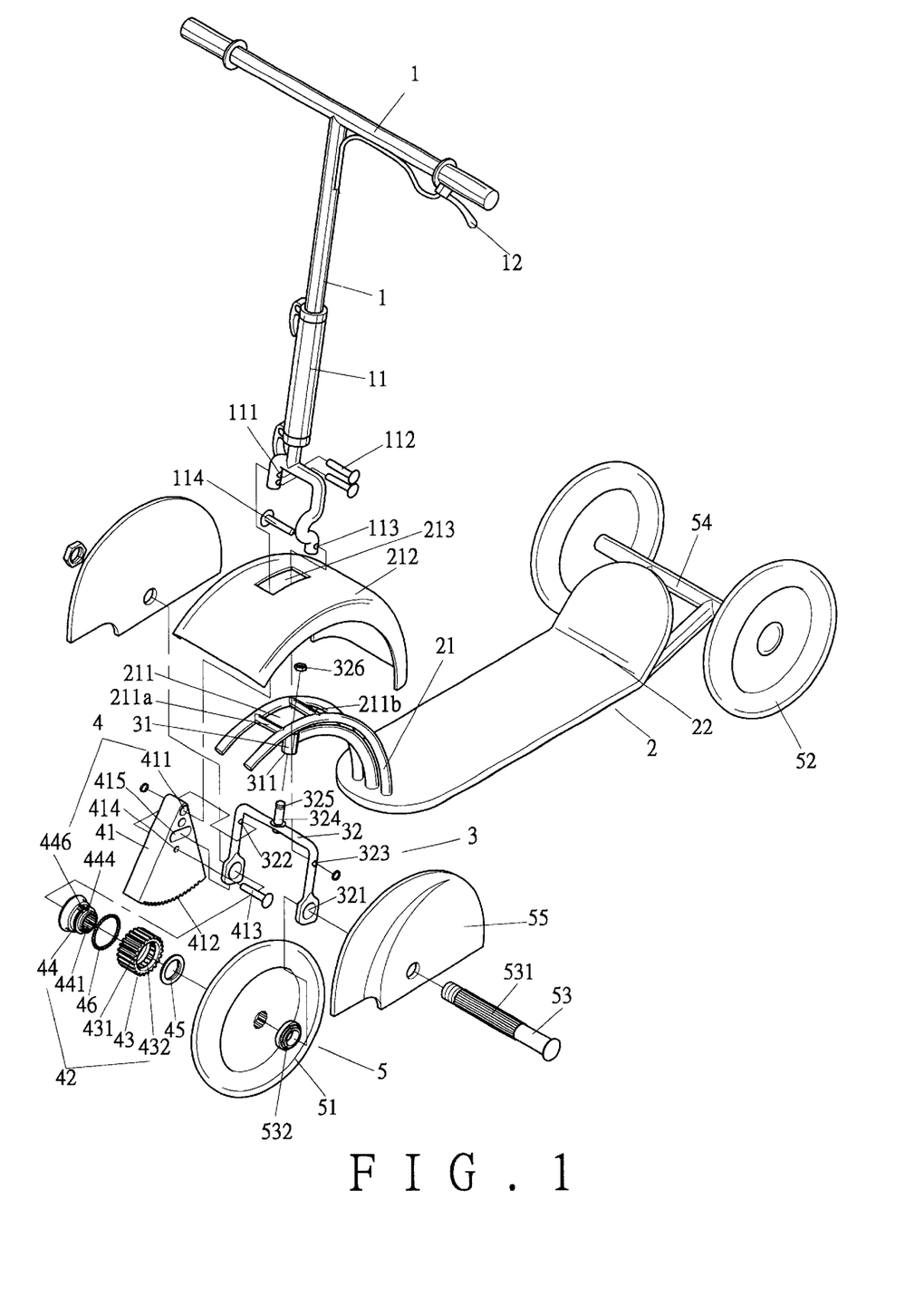
FIG. 1 is an exploded perspective view of a combined skateboard scooter/exerciser in accordance with the present invention.

The handlebar 1 includes a telescopic steering rod 11 attached to a middle thereof. The steering rod 11 includes at least one hole 111 for engaging with the transmission device 4. The steering rod 11 further comprises a hole 113 in a lower end thereof for engaging with a wheel-mounting member 32 of the steering device 3. A brake lever 12 is attached to an end of the handlebar 1 to control operation of a braking member 532 for braking, e.g., a front wheel 51 of the wheel device 5.

A connecting frame 21 is fixed to a front end of the board 2 and a support plate 22 is formed on a rear end of the board 2. The connecting frame 21 includes an operative opening 211 delimited by front and rear beams 211a and 211b. A cover 212 is mounted on top of the connecting frame 21 and includes a slot 213 through which the steering rod 11 extends.

The steering device 3 comprises a connecting member 31 and a wheel-mounting member 32. The connecting member 31 is fixed to the connecting frame 21 and comprises a receiving hole 311 in which upper and lower bearings 312 (FIG. 3) are mounted. The wheel-mounting member 32 is a substantially U-shaped member comprised of two limbs (not labeled) and an intermediate portion (not labeled). A front axle rod 53 is extended through aligned axle holes 321 in the limbs. A stud 324 is fixed to the intermediate portion of the wheel-mounting member 32 and extended through receiving hole 311 of the connecting member 31, and a nut 326 is then engaged with a threaded portion 325 of the stud 324. Thus, the wheel-mounting member 32 is rotatably supported by the bearings 312 and rotatable relative to the connecting frame 21.

The transmission device 4 includes a sector-like transmission block 41 and a transmission wheel 42. A pin 114 is extended through the hole 113 in the steering rod 11 and a hole 323 in one of the limbs of the wheel-mounting member 32. Thus, the wheel-mounting member 32 and the steering rod 11 move jointly. Two pins 112 are extended through two engaging holes 111 in the steering rod 11 and two holes 411 in an upper end of the transmission block 41. In addition, a pin 413 is extended through a hole 322 in the other limb of the wheel-mounting member 32 and a hole 414 in the transmission block 41. Thus, the transmission block 41 is securely engaged with the steering rod 11 to move therewith.

The transmission member 41 further includes a slot 415 in the upper end thereof and a toothed portion 412 in the lower end thereof.

Figure 3:
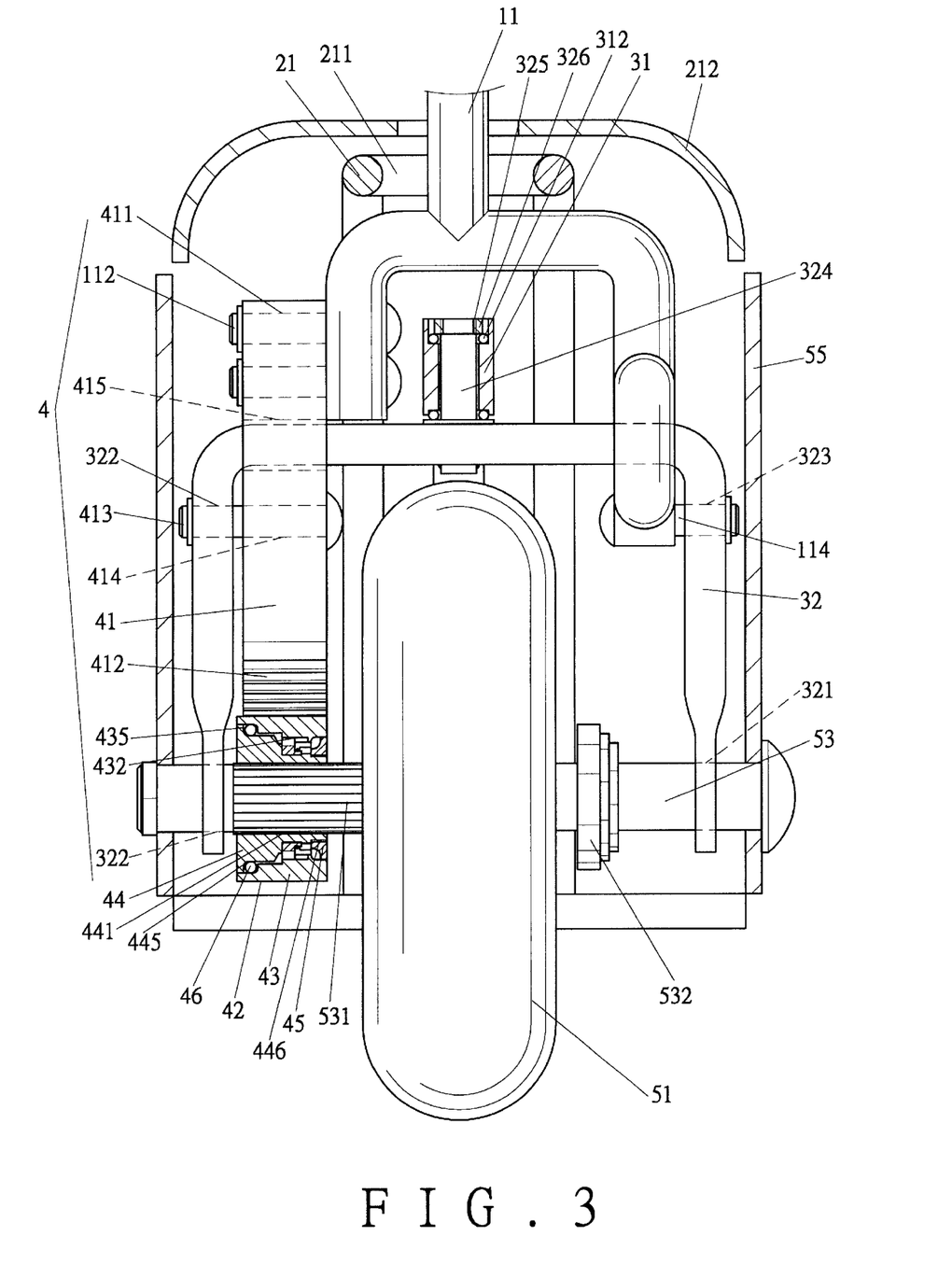
FIG. 3 is a partially sectioned elevational view of a transmission assembly of the combined skateboard scooter/exerciser in accordance with the present invention.
Figure 4:
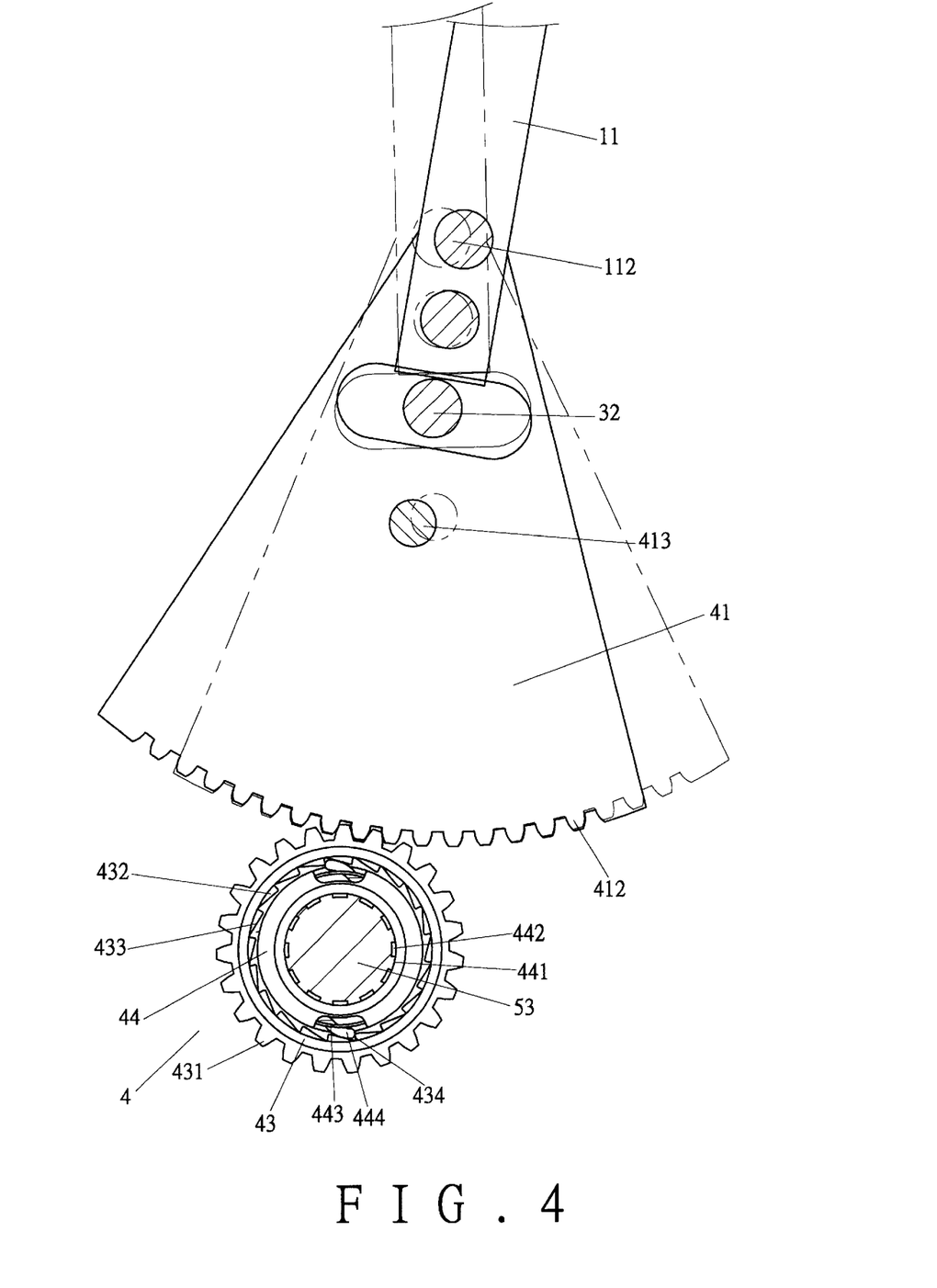
FIG. 4 is a partially sectioned view illustrating operation of the transmission assembly.

The transmission wheel 42 includes an outer tubular member 43, an inner member 44, a ring 45, and a ball bearing 46. The outer tubular member 43 includes a plurality of outer peripheral teeth 431 for meshing with the toothed portion 412 of the transmission block 41 and a plurality of inner peripheral teeth 432 for engaging with a tooth block 444 of the inner member 44, which will be described in detail later. As illustrated in FIG. 1, each of the inner peripheral teeth 432 includes an inclined surface 433 and an engaging section 434, as shown in FIG. 4. The inner periphery of the outer tubular member 43 further includes an annular groove 435 (FIG. 3) for receiving the ball bearing 46.

The inner member 44 comprises a central hole 441 for receiving a front axle rod 53 that extends through aligned holes 321 in the limbs of the wheel-mounting member 32 and a front wheel 51. An inner periphery of the central hole 441 of the inner member 44 includes keys 442 (FIG. 4) formed thereon. An outer periphery of the inner member 44 includes a movable tooth block 444 thereon and an elastic ring 443 mounted therearound. The elastic ring 443 bears against an end of the movable tooth block 444 and the other end of the movable tooth block 444 is engaged with the engaging portion 434 of the outer tubular member 43. The outer periphery of the inner member 44 further includes an annular flange 445 formed thereon for engaging with the annular groove 435 of the outer tubular member 43 and a threading 446 for threadedly engaging with inner threading (not labeled) of the ring 45. Thus, the inner member 44 is mounted in the outer tubular member 43, and the ball bearing 46 is mounted between the annular flange 445 of the inner member 44 and the annular groove 435 of the outer tubular member 43. The ring 45 is mounted around an end of the inner member 44 to ensure reliable engagement of the inner member 44 with the outer tubular member 43 with the tooth block 444 engaging with the inner peripheral teeth 432 of the outer tubular member 43. Thus, when the engaging portion 434 of each of the inner peripheral teeth 432 of the outer tubular member 43 moves toward the tooth block 444 of the inner member 44, the inner member 44 is turned. When the inclined surface 433 of each of the inner peripheral teeth 432 of the outer tubular member 43 moves toward the tooth block 444 of the inner member 44, the tooth block 444 is pressed yet the inner member 44 is not turned.

The wheel device 5 includes a front wheel 51 rotatably mounted to the wheel-mounting member 32 by the front axle rod 53 and two rear wheels 52 rotatably attached to a rear axle rod 54 attached to the support plate 22. The front axle rod 51 includes a fluted section 531 (FIG. 3) for engaging with the keys 442 of the inner member 44. Two side covers 55 are attached to both sides of the cover 212 and each include a hole (not labeled) through which the front axle rod 53 extends.

Figure 5:
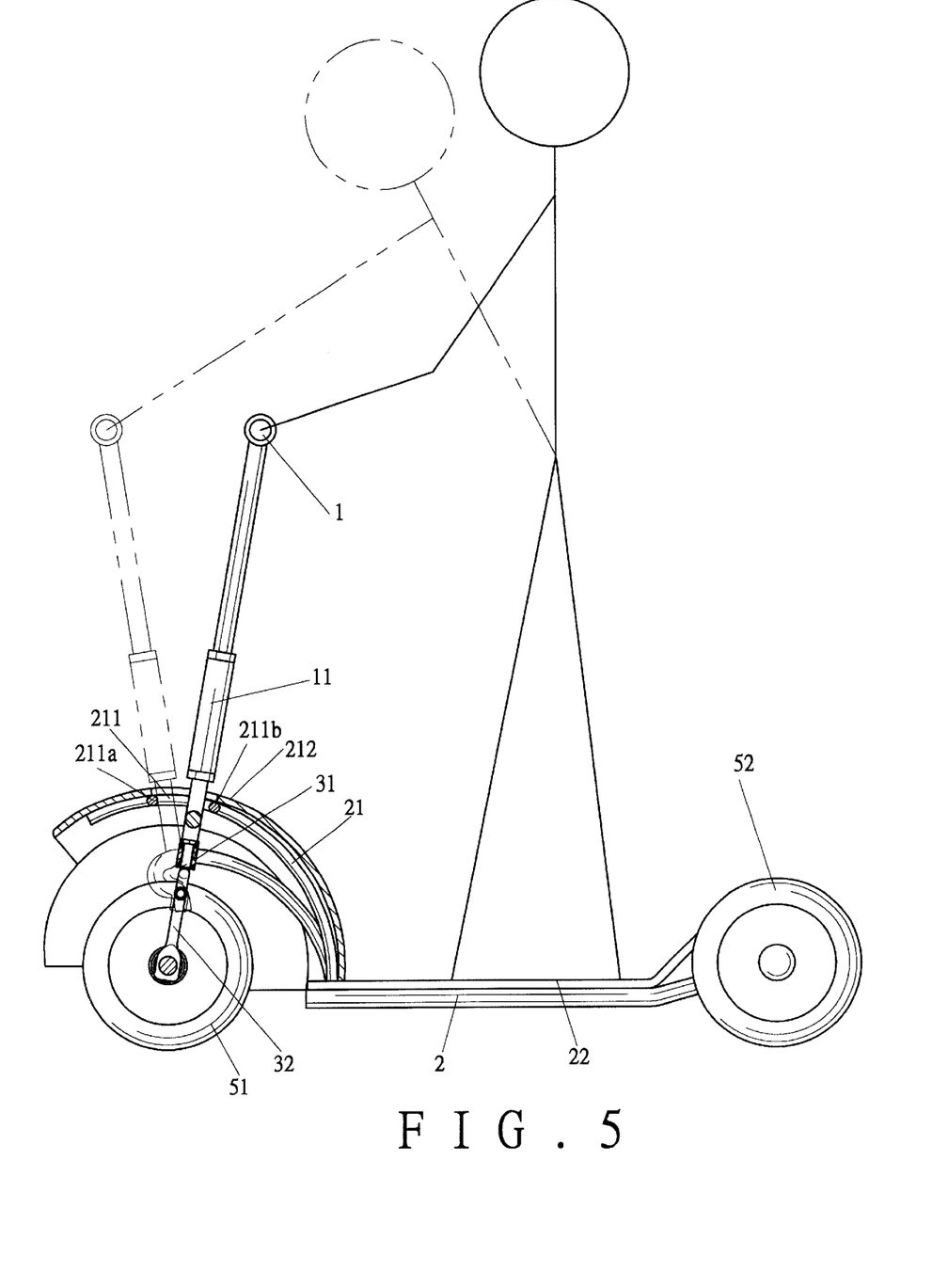
FIG. 5 is a schematic side view illustrating operation of the combined skateboard scooter/exerciser in accordance with the present invention.
Figure 6:
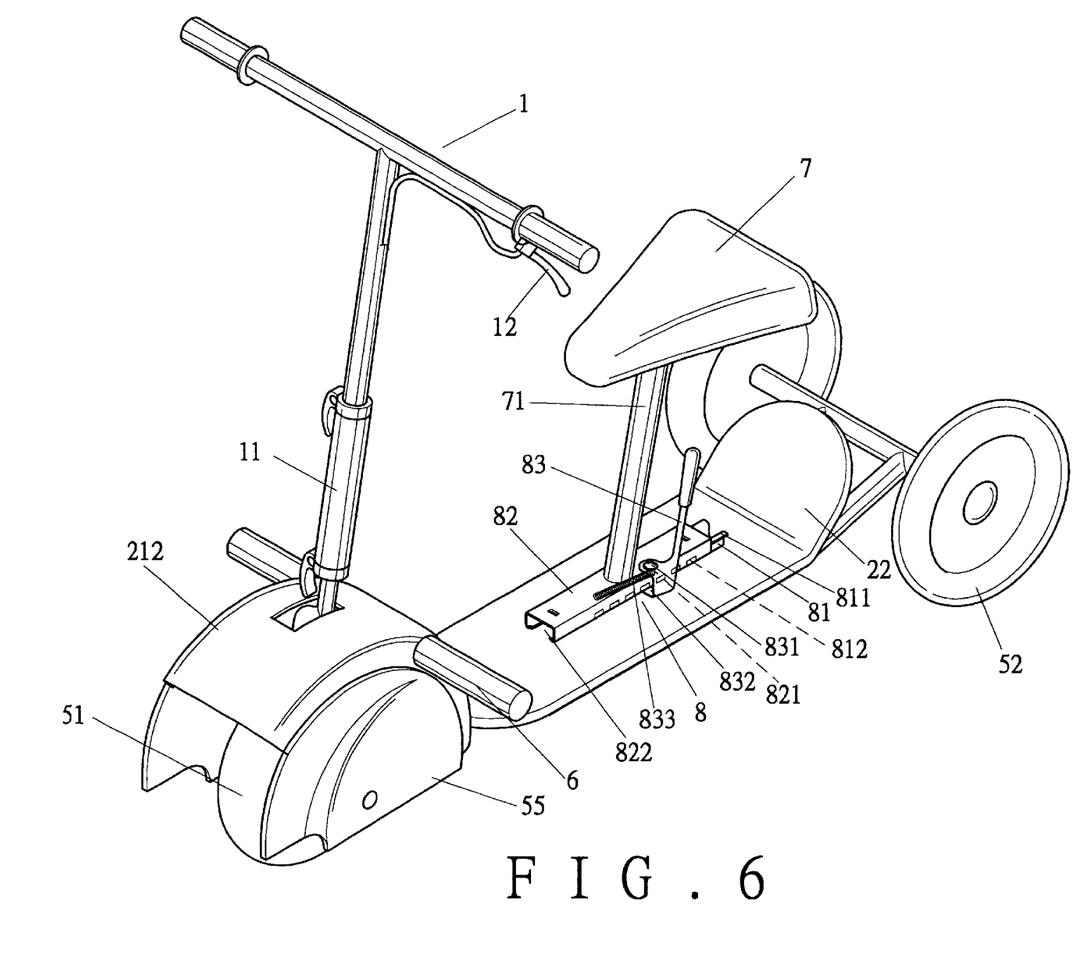
FIG. 6 is a perspective view of a modified embodiment of the combined skateboard scooter/exerciser in accordance with the present invention.
Figure 7:
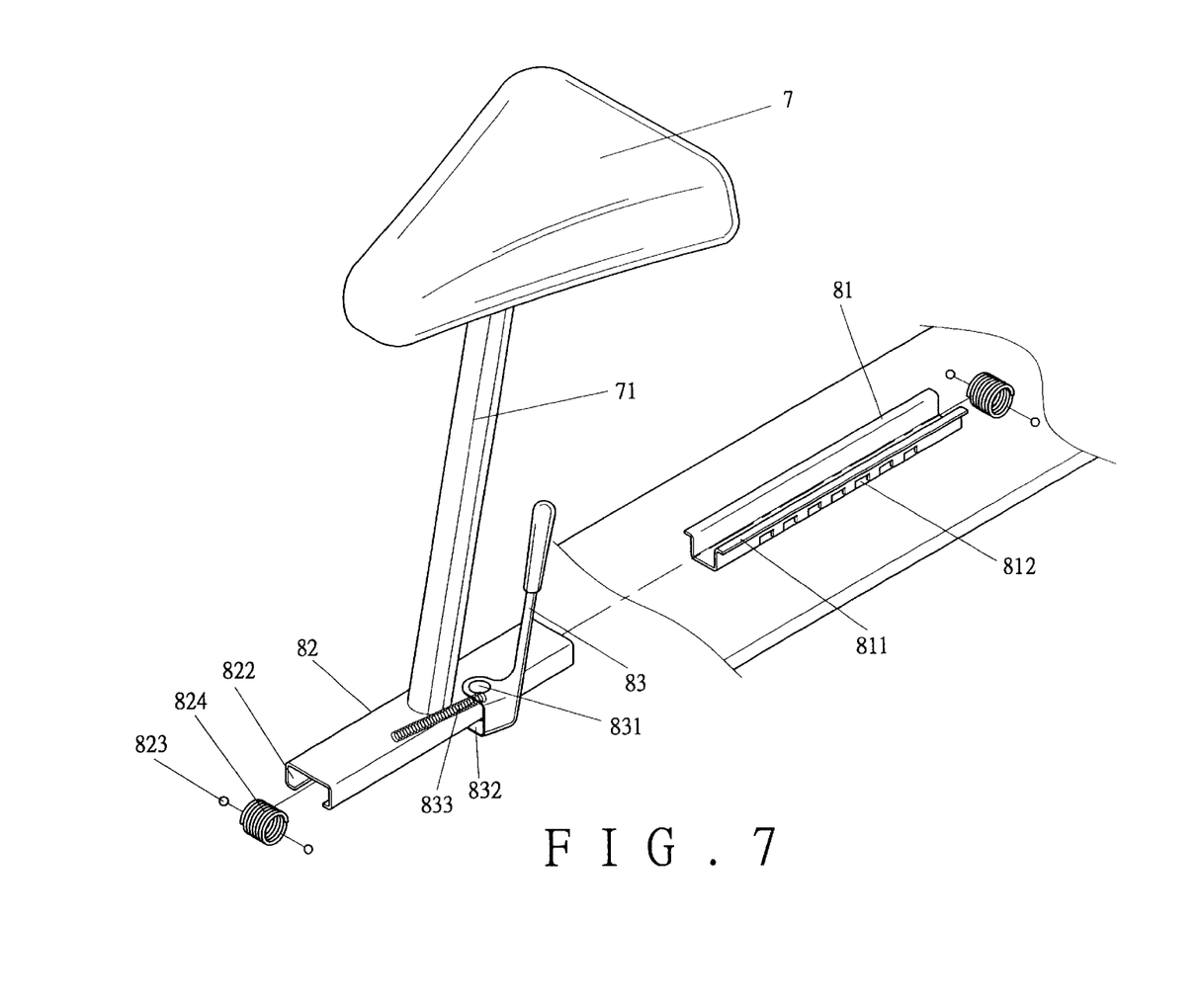
FIG. 7 is an exploded view illustrating an adjusting device of the combined skateboard scooter/exerciser in FIG. 6.

Referring to FIGS. 4 and 5, the user may move handle 1 and the steering rod 11 back and forth such that the transmission block 41 and the transmission wheel 42 move accordingly in the operative opening 211 of the connecting frame 21 to thereby move the wheel device 5 forward. When the steering rod 11 is moved rearward, via transmission by the transmission block 41 and the outer tubular member 43 that are meshed with each other, the engaging portion 434 of each of the inner peripheral teeth 432 of the outer tubular member 43 turns the inner member 44 to thereby urge the front axle rod 53 and the wheel device 5 to turn forward.

Figure 2:
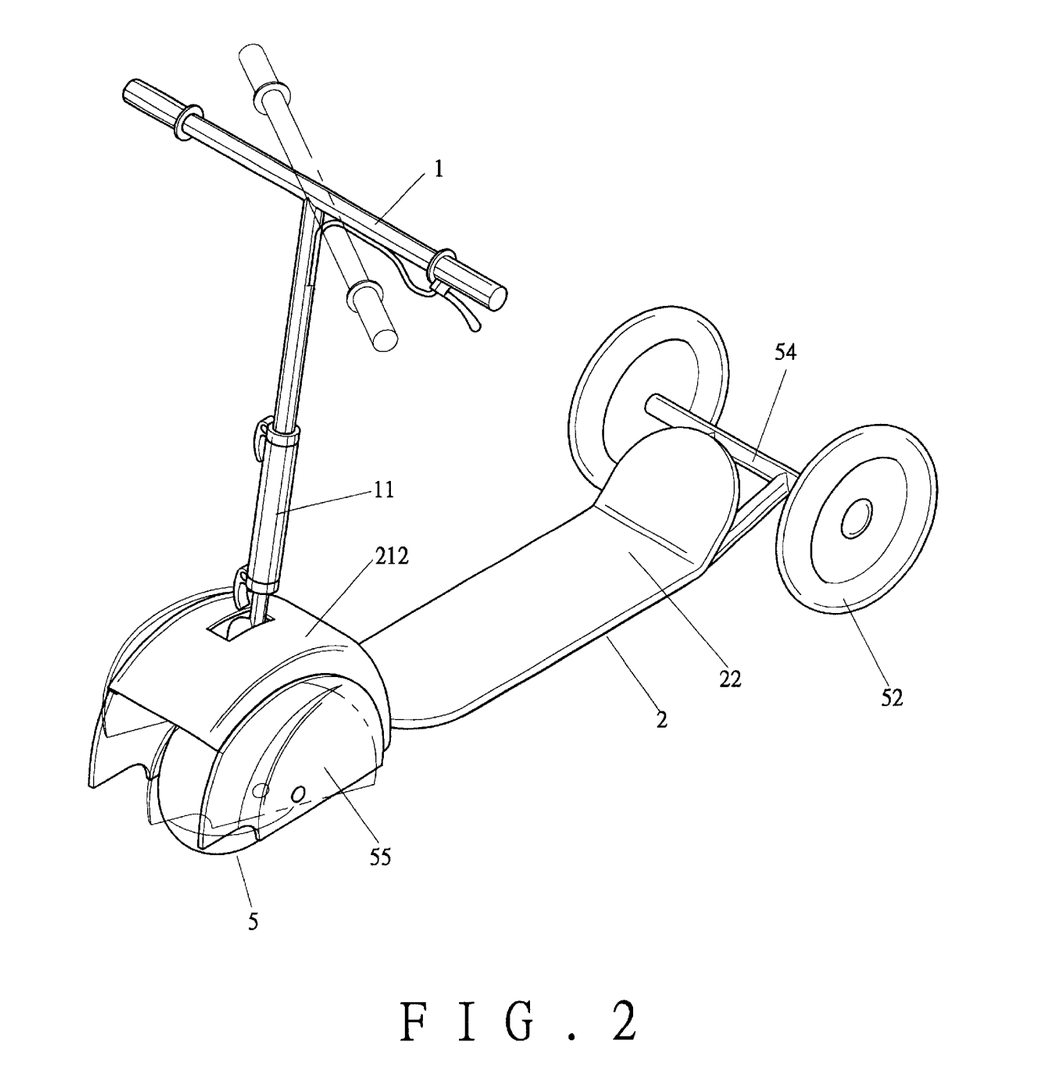
FIG. 2 is a perspective view of the combined skateboard scooter/exerciser in accordance with the present invention, illustrating steering of the combined skateboard scooter/exerciser.

When the steering rod 11 is moved forward, the inclined surface 433 of each of the inner peripheral teeth 432 of the outer tubular member 43 presses against the tooth block 444 yet the inner member 44 and the wheel device 5 are not turned. However, the wheel device 5 may keep running forward. Thus, by means of operating the steering rod 11, the user may achieve an exercise effect while using the skateboard scooter as a vehicle. As illustrated in FIG. 2, the user may control the moving direction of the combined skateboard scooter/exerciser by the handlebar 1.

Figure 8:
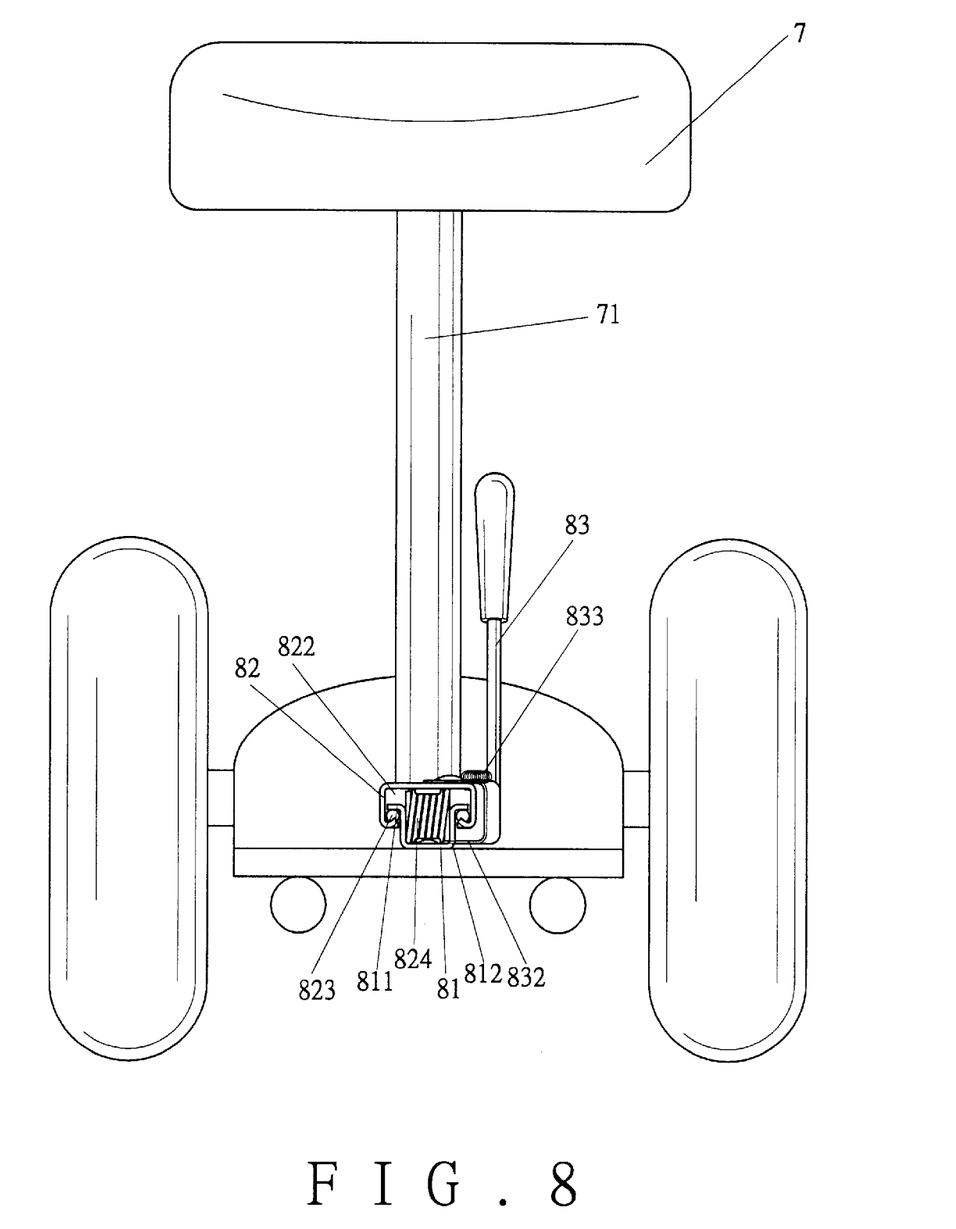
FIG. 8 is a sectional view of illustrating structure of the assembled adjusting device of the combined skateboard scooter/exerciser in FIG. 6.

Referring to FIGS. 6 through 9, in a modified embodiment of the combined skateboard scooter/exerciser, the cover 212 includes two footrests 6 on both sides thereof and a post 71 extends upward from the board 2 with a seat 7 being attached to a top of the post 71. An adjusting device 8 is mounted below the post 71 and includes an elongated fixing seat 81, a movable seat 82, and a control rod 83. The fixing seat 81 is substantially U-shape and includes a bottom securhape and includes a bottom securalls each having a lateral wing 811 formed on top thereof. One of the side walls of the fixing seat 81 has a plurality of positioning holes 812 defined therein. The movable seat 82 is substantially inverted U-shape and includes a top secured to a lower end of the post 71. A pivotal hole 821 is defined in the top of the movable seat 82 for pivotal engagement with the control rod 83. Each of two side walls of the movable seat 82 includes an engaging groove 822 for sliding engagement with an associated lateral wing 811. As illustrated in FIG. 8, a receptacle (not labeled) is defined between each engaging groove 822 and an associated lateral wing 811 for receiving a ball 823. A spring 824 is attached between the side walls of the movable seat 82. The movable seat 82 may include recessed portions in end portions and a middle thereof to prevent disengagement of the balls 823 and the spring 824. The control rod 83 has an end with a pivotal hole 831 for pivotal engagement with the movable seat 82. The other end of the control rod 83 includes an engaging portion 832. A spring 833 is attached between the engaging portion 832 and the movable seat 82 for biasing the engaging portion 832 of the control rod 83 to engage with one of the positioning holes 812 of the fixing seat 81. In operation, the user may pivot the control rod 83 to disengage the engaging portion 832 from the positioning holes 812 and then slide the movable seat 82 relative to the fixing seat 81 until the seat 7 is in a proper position relative to the handle 1 and the control rod 83 is then released to reengage the engaging portion 832 with a desired one of the positioning holes 812. Thus, the user may adjust the engaging portion 832 of the control rod 83 to selectively engage with one of the positioning holes 812 of the fixing seat 81 to thereby adjust position of the seat 7. The spring 824 may provide an appropriate resistance during movement of the movable seat 82.

Figure 9:
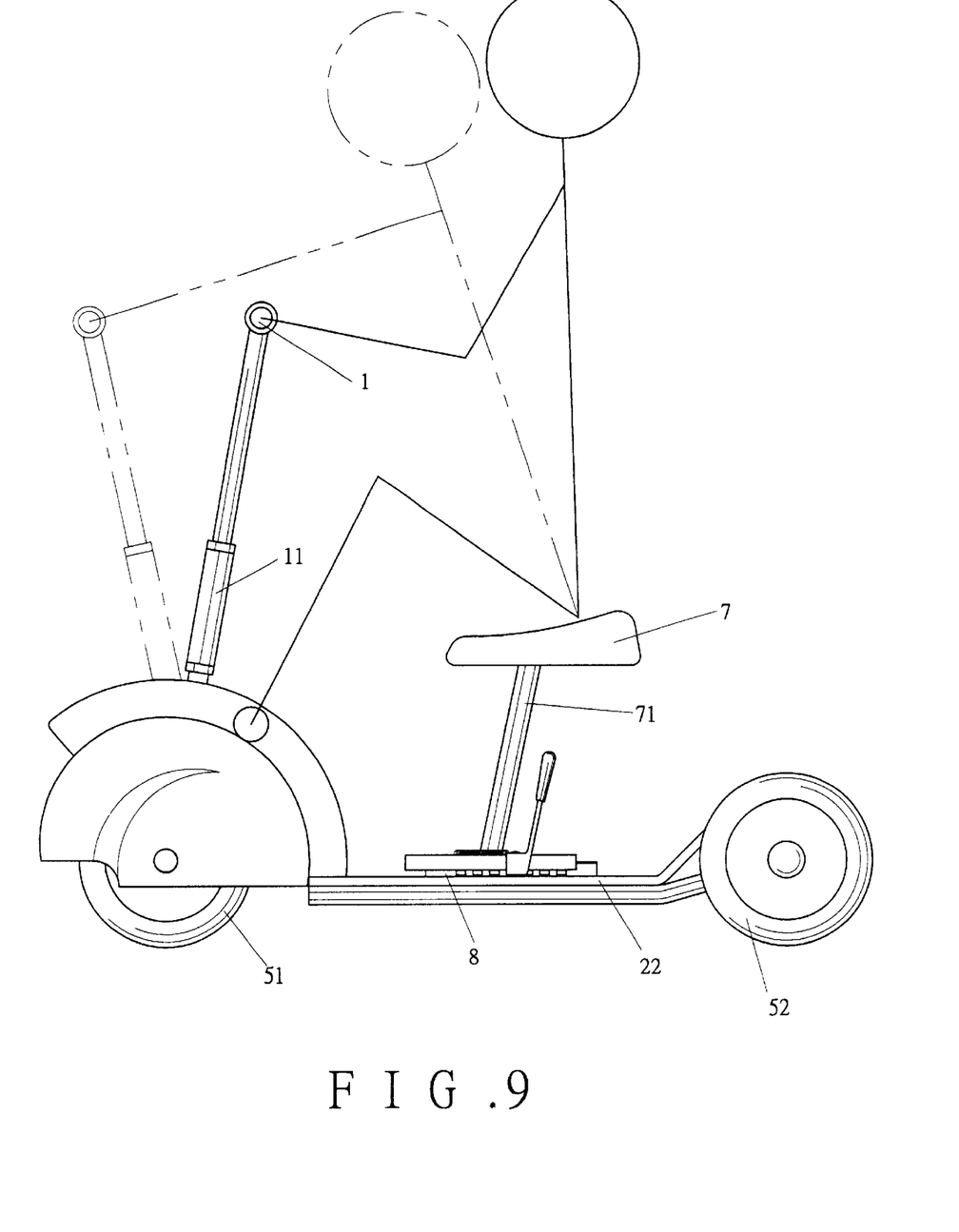
FIG. 9 is a side view illustrating operation of the modified embodiment in FIG. 6.

Referring to FIG. 9, the user may sit on the seat 7 with the feet resting on the footrests 6 and with the hands operating the handlebar 1 to move back and forth to thereby move the combined skateboard scooter/exerciser forward while achieving a rowing-like exercise effect.

Although the invention has been explained in relation to its preferred embodiment, it is to be understood that many other possible modifications and variations can be made without departing from the scope of the invention as hereinafter claimed.

What is claimed is:

1. A combined skateboard scooter/exerciser comprising:
   a board;
   a steering rod rotatably supported by the board, the steering rod having an upper end and a lower end, the steering rod being rotatable relative to the board and movable back and forth relative to the board;

a handlebar mounted to the upper end of the steering rod to move therewith;

a steering device mounted to the lower end of the steering rod to move therewith, a wheel device being mounted to the steering device; and, a transmission device mounted between the lower end of the steering rod and the wheel device such that back and forth movement of the steering rod urges the wheel device to move forward via transmission by the transmission device;

the transmission device including a transmission block and a transmission wheel, the transmission block including a first end securely engaged with the lower end of the steering rod, the transmission block further including a toothed second end for meshing with the transmission wheel;

the transmission wheel including an outer tubular member and an inner member, the outer tubular member including a plurality of outer peripheral teeth for meshing with the toothed second end of the transmission block and a plurality of inner peripheral teeth, the inner member including a central hole for securely receiving a front axle rod, the wheel device including a front wheel securely mounted around the front axle rod to turn therewith, the inner member further including a movable tooth block on an outer periphery thereof, each of the inner peripheral teeth of the outer tubular member including an inclined surface and an engaging portion;

wherein when the engaging portion of each of the inner peripheral teeth of the outer tubular member moves toward the tooth block of the inner member, the inner member is turned; and wherein when the inclined surface of each of the inner peripheral teeth of the outer tubular member moves toward the tooth block of the inner member, the tooth block is pressed yet the inner member is not turned.

2. The combined skateboard scooter/exerciser as claimed in claim 1, further comprising an elastic ring mounted around the outer periphery of the inner member, the elastic ring bearing against an end of the movable tooth block.

3. The combined skateboard scooter/exerciser as claimed in claim 2, wherein the outer periphery of the inner member includes an annular flange formed thereon, the outer tubular member including an annular groove in an inner periphery thereof for receiving the annular flange, and a ball bearing being mounted between the annular flange and the annular groove.

4. The combined skateboard scooter/exerciser as claimed in claim 3, further comprising a ring mounted around an end of the inner member to ensure reliable engagement between the inner member and the outer tubular member.

5. A combined skateboard scooter/exerciser comprising:

a board having a connecting frame fixed on a front end thereof, a cover being mounted on top of the connecting frame, two footrests being formed on both sides of the cover;

a steering rod rotatably supported by the board, the steering rod having an upper end and a lower end, the steering rod being rotatable relative to the board and movable back and forth relative to the board;

a handlebar mounted to the upper end of the steering rod to move therewith;

a steering device mounted to the lower end of the steering rod to move therewith, a wheel device being mounted to the steering device;

a transmission device mounted between the lower end of the steering rod and the wheel device such that back and forth movement of the steering rod urges the wheel device to move forward via transmission by the transmission device; and, a post extending upward from the board, a seat being mounted on top of the post.

6. The combined skateboard scooter/exerciser as claimed in claim 5, further comprising means for adjusting position of the post relative to the board.

7. The combined skateboard scooter/exerciser as claimed in claim 6, wherein the adjusting means includes a fixing seat secured to the board, a movable seat slidably mounted to the fixing seat, and a control rod, the post including a lower end secured to the movable seat to move therewith, the fixing seat including a plurality of positioning holes, the control rod including an end pivoted to the movable seat and an engaging portion that is selectively and releasably engaged with one of the positioning holes of the fixing seat.

8. The combined skateboard scooter/exerciser as claimed in claim 7, further comprising a spring attached between the control rod and the movable seat to bias the engaging portion to selectively engage with one of the positioning holes of the fixing seat.

* * * * *